Sept. 29, 1925.  1,555,679
C. H. LEWIS
HINGE
Filed Oct. 29, 1921

Inventor
Clarence H. Lewis.
By Meyers Cavanagh, Whitehead & Hyde
Attorney

Patented Sept. 29, 1925.

1,555,679

UNITED STATES PATENT OFFICE.

CLARENCE H. LEWIS, OF PUNXSUTAWNEY, PENNSYLVANIA.

HINGE.

Application filed October 29, 1921. Serial No. 511,268.

*To all whom it may concern:*

Be it known that I, CLARENCE H. LEWIS, a citizen of the United States, and resident of Punxsutawney, in the county of Jefferson and State of Pennsylvania, have invented certain new and useful Improvements in Hinges, of which the following is a specification.

An object of the invention is to provide an improved hinge.

Another object of this invention is to provide an improved hinge of the ball and socket type especially adapted to be used in connection with swinging objects, such as porch swings and the like.

Still another object of this invention is to provide a hinge of the ball and socket type having cooperating parts securely engaging each other when in operation, and in which the parts may be readily and quickly assembled and taken apart.

In the accompanying drawings a preferred form of the device is shown.

Figure 1:
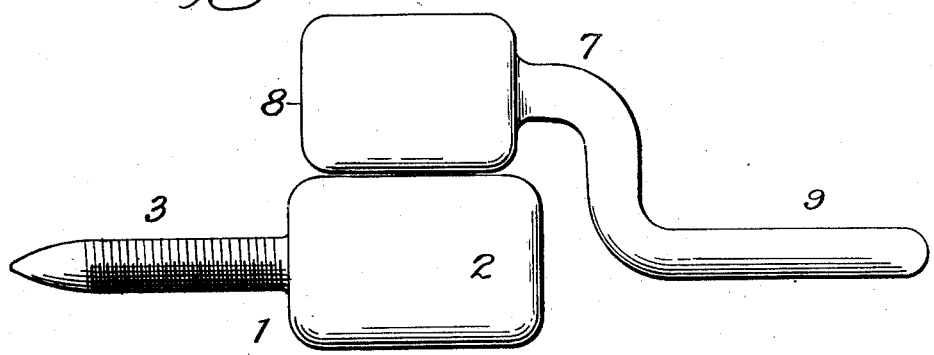
Fig. 1 is a side elevation of the hinge.

In the drawing the device is shown composed of two parts. One of these parts is in normal use stationary, being securely attached to some fixed object. The other is movable, being pivotally engaged with the stationary part. The stationary part is as a whole designated by the numeral 1, and has a body part 2 having a threaded shank 3 extending therefrom. In use the threaded shank is screwed into some timber or overhead body suitably located for supporting a swing or other pendant object. In one side of the body is a socket 4, which has that wall remote from the threaded shank undercut or chambered as shown at 5 to conveniently receive the head of a ball and hanger member hereinafter described. Conveniently located in the stationary member or part is an oil duct 6, by which oil can be supplied to the socket 4 for the purpose of lubrication. In the present instance the duct is shown located at the rear of the opening into the socket.

The hangar part, designated by the numeral 7, has a body 8, a hook 9, and a head or ball 10. The head or ball 10 extends from one side of the body 8 and is connected thereto by means of a neck 11, which partly serves as a bearing when the ball is in engagement with the socket in the stationary member. The neck is of smaller diameter than the head and connects the head to the body in such a way that the line of one side of the neck is substantially tangent to the ball. By this means the neck and head form a hook on one side of the hanger part or the member to engage in the socket of the stationary part.

Extending from the body of the hanger member at right angles to the neck and in line with the projecting head is an offset hook 9 to which a chain or other suitable means may be hooked to support a swing or other article. The hook 9 is offset from the body so that the line of pull, due to the weight, may be through the point of contact between the stationary member and the hanger member.

Figure 2:
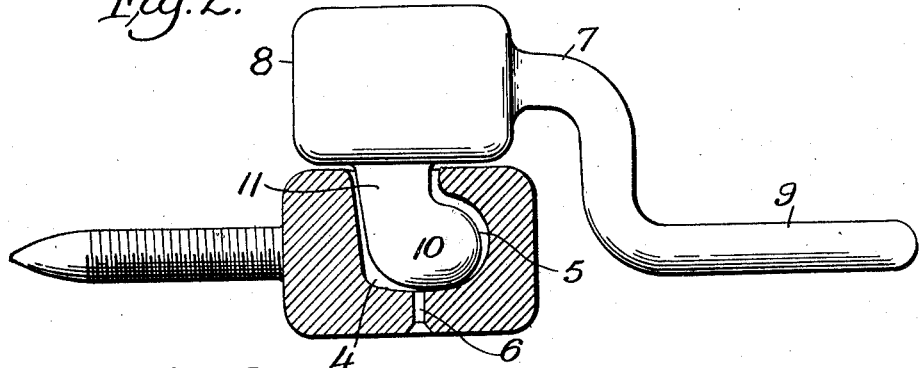
Fig. 2 is a view similar to Fig. 1, showing the socket member in section.
Figure 3:
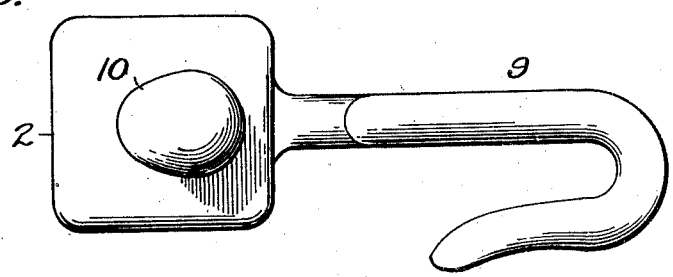
Fig. 3 is a view of the hanger part showing the ball.
Figure 4:
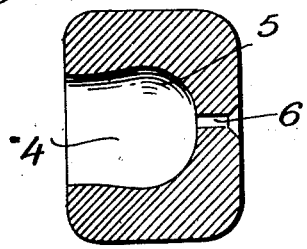
Fig. 4 is a section through the stationary member showing the socket and the oil duct.

The peculiar form of ball and socket structure here shown is such that any increase in weight will lessen the liability of the parts to separate, and such that as long as there is a pull on the hanger member in the direction of the hook the parts cannot be separated, but to separate the parts it is necessary to tilt or give the hanger member a rotary movement in substantially the plane of Fig. 2.

What I claim is:

A hinge comprising members adapted to abut laterally, one member having a socket, and the other a head received within the socket, said members having rigid extensions for connection with parts to be connected by the hinge, the extensions extending in opposite directions, the wall of the socket remote from the extension undercut, and the head shaped to fit the undercut wall, thereby to prevent disengagement of the members by direct movement away from each other in any direction, the first named member extending beyond the socket on all sides thereby to cover and conceal the socket when the members are connected.

Signed at Punxsutawney in the county of Jefferson and State of Pennsylvania this 22nd day of Oct., A. D. 1921.

CLARENCE H. LEWIS.